United States Patent Office 3,411,272
Patented Nov. 19, 1968

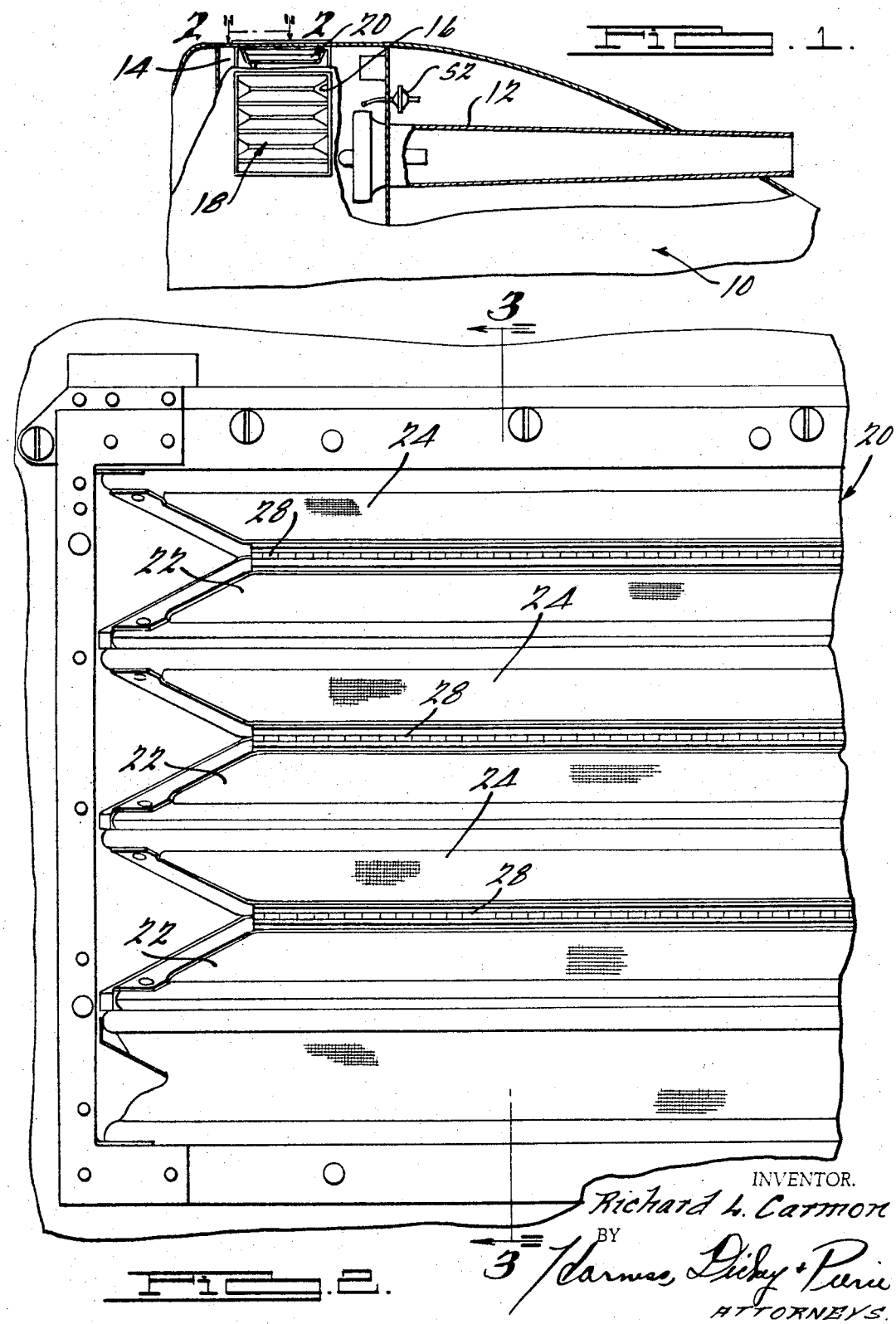

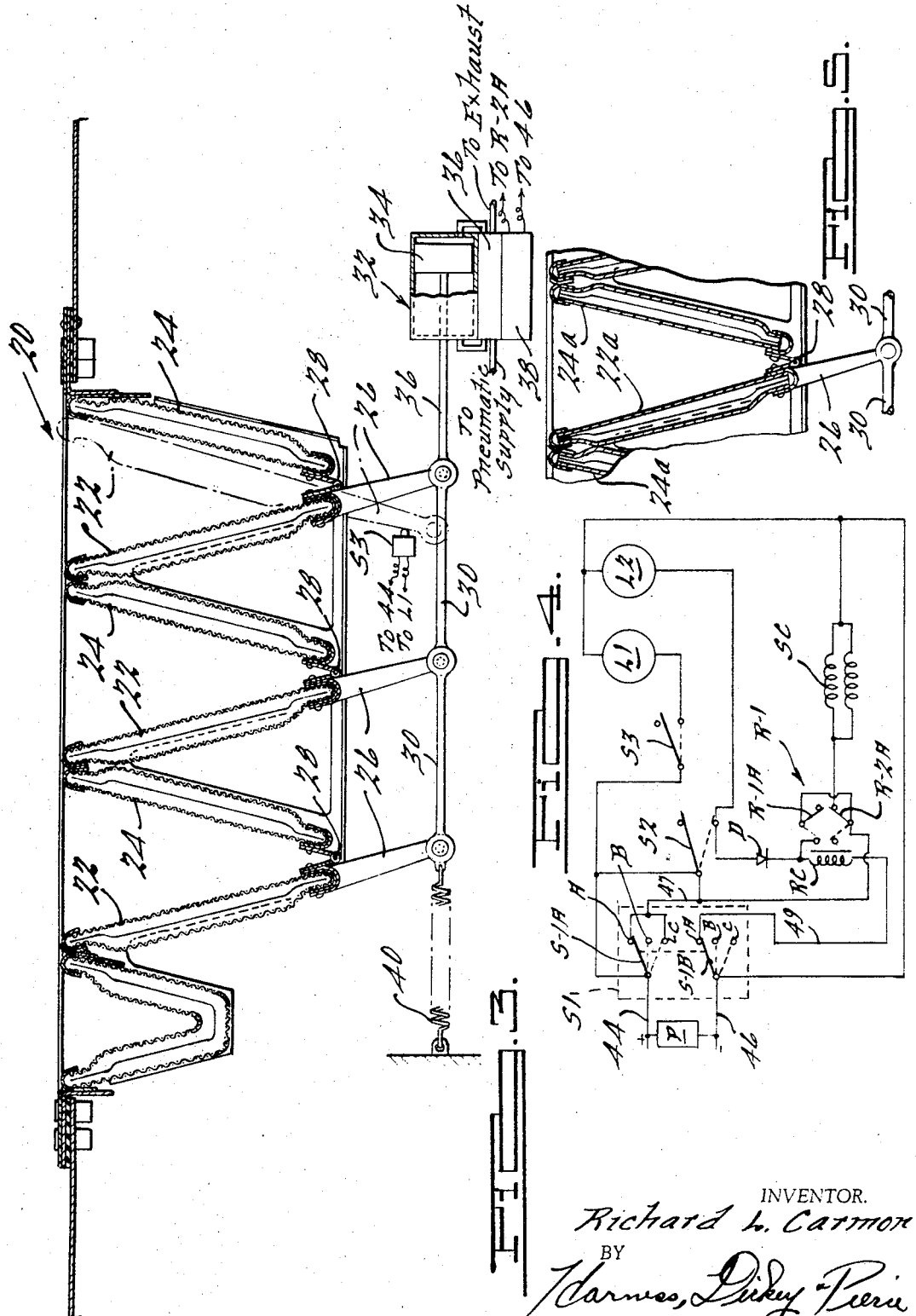

3,411,272
AUTOMATIC FLUID BYPASS SENSING, ACTUATING, AND INDICATING SYSTEM
Richard L. Carmon, Birmingham, Mich., assignor to Michigan-Dynamics, Inc., Detroit, Mich., a corporation of Michigan
Filed Feb. 7, 1966, Ser. No. 525,589
25 Claims. (Cl. 55—274)

ABSTRACT OF THE DISCLOSURE

A filter construction having a closed position for filtering air and an open position in which the filters are bypassed and apparatus for automatically controlling the pressure responsive opening and closing of the filters.

---

The present invention relates to fluid bypass control systems and more particularly to a control system for the actuation of air filters for air breathing apparatus utilizing air from the atmosphere at its inlet.

In helicopters using turbine engines, the air to the inlet of the engine is normally first passed through a filter in order to remove particles which could be harmful to the engine components. Filters are provided to remove these impurities in the air; however, if the filters become filled or clogged, insufficient air will be available to the engine resulting in possible damage to the engine and a possible loss of power to the engine of the helicopter. In the event of such conditions, it would be desirable to be able to bypass the filters to supply the needed air at least until the aircraft can be safely landed. In the present invention, apparatus is provided whereby the filters can be opened or closed, either by manual or automatic selection, to provide a bypass for air to the engine. The system also provides warning devices whereby the operator or pilot can visually determine the condition of the filters, i.e., clogged unclogged and also to indicate the condition of the bypass, i.e., opened or closed. With this information, the operator or pilot can readily evaluate the condition of the filter system and hence can anticipate and avert a possibly dangerous situation. While the present system is shown and described in connection with an air filter system for a turbine engine for a helicopter, it should be understood that the system of the present invention is applicable to other fluid systems.

Therefore, in view of the above, it is an object to provide a novel control system for apparatus utilizing fluid filters.

It is another object of the present invention to provide a novel control system for apparatus utilizing air filters.

It is another object of the present invention to provide a novel control system for actuating air filters whereby an air bypass can be opened or closed.

It is another object of the present invention to provide a novel control system for actuating air filters into either a filtering or a bypass condition.

It is another object of the present invention to provide a novel control system for automatically actuating a bypass for air filters.

It is still another object of the present invention to provide a novel control system being operable either by automatic or manual selection for directing air through an air filter or for providing a bypass therethrough.

It is still another object of the present invention to provide a novel control system for air filters for an engine for an aircraft and subject to automatic or manual selection whereby the air to the egnine can be caused to flow either through the air filter or through a bypass.

It is still another object of the present invention to provide a novel control system for an air filter which is actuable to a filtering or to bypass condition and which includes signaling apparatus which provides to the operator a visual indication of the condition of the filter system.

Other objects, features, and advantages of the present invention will become apparent from the subsequent description, taken in conjunction with the accompanying drawings, in which:

FIGURE 1 is generally a pictorial fragmentary drawing depicting the system of the present invention as applied to a helicopter;

FIGURE 2 is a view to enlarged scale of the apparatus shown in FIGURE 1 taken substantially along the line 2—2;

FIGURE 3 is a sectional view of the apparatus of FIGURE 2 taken generally along the line 3—3 with additional apparatus shown diagrammatically;

FIGURE 4 is a circuit diagram of the electrical control apparatus for use with the system of the present invention; and FIGURE 5 is a fragmentary sectional view of a modified form of the present invention.

Looking now to the drawings, specifically FIGURE 1, a helicopter is partially shown and generally indicated by the numeral 10 and includes a turbine engine 12 which has its inlet positioned to receive air from an inlet compartment or plenum 14. The compartment 14 is generally enclosed and has an air inlet portion generally indicated by the numeral 16. The air inlet is provided with a pair of fixed side filter assemblies (only one shown and indicated by numeral 18) and a movable top filter assembly 20. The side filter assemblies, such as filter assembly 18, are positionally fixed to constantly provide filtering action.

A vacuum actuated switch S2 senses the difference in pressure between that existing in the compartment 14 and the ambient pressure in the atmosphere and serves a purpose to be later described. The top filter assembly 20 is more specifically shown in FIGURES 2 and 3 and is of a louvered construction including a plurality of fixed louvers 24 and a plurality of pivotably movable louvers 22. The filters of louvers 22 and 24 can be of a construction well known in the art whereby harmful dirt particles, etc. are captured while passage of air is permitted. The movable louvers 22 cooperate with the stationary louvers 24 in a closed position, as shown in the drawings, to completely close the inlet through the upper portion of the compartment 14. The movable louvers 22 are pivotally mounted at their lower extremities about pivots 28 and in the closed position engage an opposite one of the fixed louvers 24 at its upper end in the manner as shown in the drawing. Each of the movable louvers 22 is provided with a lower actuating arm 26 which extends oppositely from the pivots 28. The arms 26 can be all connected together by appropriate linkage members 30 for simultaneous actuation; by moving the links 30 to the left as viewed in the drawing of FIGURE 3, the movable louvers 22 will be pivoted clockwise about pivots 28 and brought generally in juxtaposition with the adjacent ones of the fixed louvers 24. In this position the passage through the top filter assembly 20 is opened and air will pass freely therethrough while bypassing the filters of louvers 22 and 24.

Movement of the movable louvers 22 can be provided by means of a pneumatic piston assembly 32 which has its movable piston 34 connected to the connecting links 30 by means of a drive link 36. The piston assembly 32 can be actuated by a 4-way pneumatic valve 36 which in turn is actuated by an electric solenoid 38, in a manner to be described. The 4-way valve 36 and the piston assembly 32 can be of a conventional construction well known in the art and hence the details thereof have been omitted for purpose of simplicity. The pneumatic power necessary to actuate this apparatus can be obtained from the engine 12 by conventional apparatus. At the opposite end, the links 30 are connected to a coil spring member 40 which is preloaded to normally urge the louver members 22 to an open position. This construction provides a fail safe feature to be described in more detail. The actuation of the solenoid 38, and hence the valve 36 and movable louvers 22, is controlled by electrical circuitry as shown in FIGURE 4.

In FIGURE 4 a double pole selector switch is generally indicated by the designation S1 and is provided with a pair of poles S–1A and S–1B. The pole S–1A is connected to the positive side of a direct current source of potential P via a conductor 44 while the pole S–1B is connected to the negative side of the source P via a conductor 46. The movable arms of the poles S–1A and S–1B are ganged together and can be simultaneously located in any one of the positions A, B, or C as shown in the drawings. The selector switch S1 normally would be located at the control panel on the helicopter 10 and in the position as shown in FIGURE 4, would place the control apparatus for the top filter assembly 20 in an automatic condition.

The positive conductor 44 in addition to being connected to the movable arm for the pole S–1A is also connected to the arm of the vacuum switch S2 which is of a single pole type and to the arm of a single pole, single throw switch S3. The vacuum switch S2 is normally in the open position, as shown in the drawing of FIGURE 4, and will be closed upon the differential between the air pressure located within the compartment 14 and the ambient pressure increasing to a preselected level indicating loss of air flow into the air inlet compartment 14. This preselected pressure differential is selected to correspond to a condition in which the side filter assemblies, such as 18, and the upper filter assembly 20 are clogged and insufficient air is being drawn into the air inlet compartment 14.

The switch S3, which as shown in FIGURE 4 is normally open, is also shown in the drawing of FIGURE 3 and is positioned to be closed when one of the lever arms 26 is pivoted in a clockwise direction to a position at which the movable louvers 22 are in their open position; thus switch S3 provides an indication that the top filter assembly 20 is open or that a bypass has been provided for the inlet air around the filters of louvers 22 and 24. An indicating light L1 has one side connected to the switch S3; the opposite side of the light L1 is connected to the negative or ground side of the source of potential P via the conductor 46. Thus the light L1, which is located in the control panel of the helicopter 10, when it is deenergized, provides an indication that the movable louvers 22 are closed; upon movement of the louvers 22 to the open position and closing the switch S3, the light L1 will be energized to provide an indication that the louvers 22 are opened.

The vacuum switch S2 is normally opened; however, upon the occurrence of a pressure condition occurring when insufficient air is drawn into the air inlet compartment 14, the switch S2 will be closed. The switch S2 is connected to one side of an indicating light L2 which is located at the control panel and which has its opposite side connected to ground via the conductor 46. Thus the light L2 normally will be deenergized and in this condition will indicate that the pressure conditions within the air inlet compartment 14 are such that sufficient air is being provided to the engine 12. However, when insufficient air is being provided as when the filter assemblies are clogged, the vacuum switch S2 will connect the light L2 to the positive side of the source of potential P causing the light L2 to be energized.

With the selector switch S1 in the A position the arm of pole S–1A is connected to a pair of movable contacts R–1A and R–2A of a relay R–1 via a conductor 47. In the position as shown, the movable contact R–1A is connected to an open circuit while the movable contact R–2A is connected to the coils SC of the solenoid 38, which actuates the four-way pneumatic valve 36. The opposite sides of the coils SC are connected to ground via the conductor 46. Thus with selector switch S1 in its A position the coils SC of the solenoid 38 are normally energized which places the four-way valve 36 in position to actuate the piston 34 in a direction to maintain the movable louvers 22 closed as shown in FIGURE 3. The actuating coil RC for the relay R–1 has one end connected to ground conductor 46 via conductor 49 and via the pole S–1B in the A position and has its opposite end connected to the cathode of a diode D which in turn has its anode connected to the contact of the vacuum switch S2. The same contact of vacuum switch S2 is also connected to the high side of the indicating lamp L2. Thus with the selector switch S1 in the automatic position A, as shown in FIGURE 4, and with sufficient air being provided through the filters and into the air inlet compartment 14, the switch S2 will be opened as shown. Since with adequate air through the filters the movable louvers 22 are in their closed position, the switch S3 will also be open. In this condition neither of the indicating lights L1 and L2 will be lit. Assuming now that a condition exisits in which the filter assemblies such as side filter 18 and top filter assembly 20 become clogged and insufficient air is drawn into the inlet compartment 14, then the vacuum switch S2 will be closed whereby current will flow through diode D, through the coil RC of relay R–1 and thence to ground via conductor 49 and the pole S–1B. On actuation of relay R–1 the contacts R–1A and R–2A will be moved to their alternate positions as shown in dotted lines. In these positions the contacts R–2A will be open circuited and the contacts R–1A, previously open circuited, will be closed. With the contacts R–2A open circuited the current to the solenoid coil SC of the solenoid 38 is interrupted whereby the four-way valve 36 is moved to a condition in which pressure is applied to the opposite side of the piston assembly 34 whereby it moves to the left as shown by the drawing of FIGURE 3. At this point the preload of the spring 40 aids the movement of the connecting links 30 to the left and hence the louvers 22 are pivoted in a clockwise direction to move them to their open positions whereby sufficient air can then be drawn into the air inlet compartment 14. Note that initially upon closing the vacuum switch S2, the indicating lamp L2 will be lit indicating an inadequate pressure or air supply condition in the air inlet compartment 14. However, upon opening of the movable louvers 22 and correction of this condition the vacuum switch S2 is opened and the light L2 will be extinguished thereby providing an indication that the inadequate air supply condition has been automatically corrected. By moving the louvers 22 to their open position, the switch S3 will be closed thereby energizing the light L1 providing an indication to the operator that the louvers 22 are in their open position. While the relay coil RC was initially energized by closing the vacuum switch S2, a hold path is provided for the relay coil RC via a conductor connected across contacts R–1A and R–2A such that when the pressure condition in the inlet compartment 14 is corrected and the vacuum switch S2 is opened, the coil RC will be maintained energized via the now closed contacts R–1A. The diode D blocks the positive potential at the conductor from the light L2 whereby an erroneous indication is prevented when vacuum switch S2 is opened, i.e., without diode D, the light L2 would be maintained lit even though switch S2 was opened and an adequate supply of air was being provided to the engine 12.

Note that if for some reason or another the louvers 22 will not move to the open position then the indicating light L1 will be maintained off while the indicating light L2 will be maintained on since the adverse pressure condition will not have been corrected. This will indicate some malfunction in the mechhanism for opening the louvers 22 and will alert the pilot or operator of the continuance of the adverse pressure condition in order that appropriate emergency steps may be taken. Assuming now a situation in which the movable louvers 22 are opened; the switch S3 is closed and the indicating light L1 will be lit. However, if some other obstrutcion is blocking the top filter assembly 12 preventing the intake of air into the inlet compartment 14, the vacuum indicating element 22 will sense this condition and the switch S2 will be maintained closed thereby maintaining the light L2 lit. Again this will provide an indication to the operator or pilot of a continuation of an adverse condition in order that appropriate emergency steps may be taken.

There can be conditions in which it is desirable that the actuation of louvers 22 is selected manually. For example, a situation may arise in which in the automatic position the louvers 22 are maintained closed since the vacuum switch S2 has not been closed. It may be the judgment of the operator or pilot that the louvers 22 should be placed in an open condition. To effectuate this, the selector switch S1 is placed in its center or off position in which the poles S–1A and S–1B are placed in the B positions.

In this position, the circuit to the coil SC of the solenoid 38 is interrupted thereby deactuating the solenoid 38 thus placing the valve 36 in a position in which the piston 34 and the spring 40 will then move the louvers 22 to their open position. In this position the switch S3 will be closed whereby the light L1 will be lit. Likewise the vacuum switch S2 will be open or closed depending on the pressure conditions and light L2 will function accordingly. Note then that the lights L1 and L2 provide their appropriate condition indication independently of the position of the selector switch S1.

In still another condition it may be desirable, regardless of the actual conditions existing to maintain the louvers 22 closed; this can be accomplished by placing the selector switch S1 with the poles S-1A and S-1B in their C positions. The stationary contacts for the pole S-1A in positions A and C are connected together and connected to conductor 47; hence with the pole S-1A in its C position, the positive potential from the source of potential P via conductor 44 will be applied to the contacts R-1A and R-2A of the relay R-1. At the same time the pole S-1B in its B position is open circuited thereby removing the ground path from the coil RC of the relay R-1. In this condition the relay R-1 will have its contacts R-1A and R-2A in their normally unenergized conditions, as shown in the drawing of FIGURE 4. In this condition the contacts R-2A connect the positive side of potential from the source P via conductor 47 to the coil SC of the solenoid 38, which has its opposite side connected to ground via the conductor 46. With the solenoid coil SC maintained energized, the four-way pneumatic valve 36 will be maintained in a position to provide pressure to the actuating piston 34 such as to maintain the louvers 22 in their closed positions. Thus regardless of the condition of the vacuum switch S-2, i.e., whether opened or closed, the relay coil RC of the relay R-1 cannot be energized and hence the position of the contacts of the relay R-1 cannot be altered. In this condition of selector switch S1 it is possible for an adverse pressure condition to exist within the air inlet compartment 14 whereby the vacuum switch S2 has been closed and the indicating light L2 has been lit; however, the coil RC cannot be actuated since its ground path has been opened and the louvers 22 are maintained closed. Thus the closed position of louvers 22 can be manually selected regardless of the condition of the filters and hence of the position of vacuum switch S2; the manual selection of this condition may be dictated by adverse circumstances. For example, it may be that the helicopter 10 is being operated in a condition in which an extreme amount of dust and dirt is in the surrounding atmosphere and it may be the pilot's judgment that at least temporarily despite the fact that the filters are clogged, it would be best for the engine 12 that the movable louvers 22 be maintained closed, at least temporarily.

With the selector switch S1 having its poles S-1A and S-1B in their B positions, and hence by maintaining the louvers 22 closed, it will be impossible for the switch S3 to be actuated and hence the light L1 will be maintained deenergized. Note again that switches S2 and S3 function independently of the position of selector switch S1.

The spring 40 provides a safety feature such that in the event of loss of electrical and/or pneumatic power the louvers 22 will be automatically opened; thus in no event will a power failure result in the louvers 22 being held closed.

A modified form of the invention is shown in FIGURE 5. In the modified form adequate fixed filters are provided whereby sufficient air can be provided to engine 12; in this case the louvers 22a and 24a are solid panels. Again the movable louvers 22a will be connected in the same manner as louvers 22 of FIGURES 1–4 and will operate in the same manner to provide for a controlled bypass for air to the inlet of engine 12.

Thus a system has been shown which can be selected for automatic operation whereby a bypass will be automatically provided to the inlet of an engine upon clogging of the filters; in addition the system has manual selection whereby the bypass can be selected to be held closed or selected to be held opened. In addition signal indications are provided to the operator both of the condition of the filters and the condition of the bypass.

What is claimed is:

1. An air filter system for an air circuit for air breathing apparatus receiving air from the atmosphere comprising filter means having an inlet open to the atmosphere and an outlet and being located in the air circuit for filtering the air passing from said inlet to said outlet and through the air circuit, said filter means comprising filter elements located between said inlet and said outlet, sensing means located in the air circuit for providing a first signal responsively to the air pressure at said outlet attaining a preselected magnitude, said filter means including bypass means actuable into one condition for providing a path for the air to bypass said filter elements and into another condition for directing the air through said filter elements, said bypass means having a first condition for being automatically actuable into said one condition responsively to said first signal.

2. The system of claim 1 with said bypass means having a second condition in which one of said one and other conditions is selected regardless of the occurrence or non-occurrence of said first signal.

3. The system of claim 1 with said bypass means having a second condition in which said one condition is selected regardless of the occurrence or non-occurrence of said first signal and having a third condition in which said other condition is selected regardless of the occurrence or non-occurrence of said first signal.

4. The system of claim 1 with said filter means including spring means for normally biasing said bypass means to said one condition and with said filter means including actuating means operable from a source of generated power for actuating said bypass means to said other condition over the bias of said spring means.

5. The system of claim 1 including indicating means for providing an indication to the operator of the condition of said bypass means.

6. The system of claim 1 including indicating means for providing an indication to the operator of the occurrence of said first signal.

7. The system of claim 1 with the air breathing apparatus being an engine for an aircraft.

8. The system of claim 1 with at least some of said filter elements being movable and with said bypass means including said some of said filter elements for moving said some of said filter elements to a position closing said inlet in said other condition and to a position opening said inlet in said one condition.

9. The system of claim 8 with said bypass means having a second condition in which one of said one and other conditions is selected regardless of the occurrence or non-occurrence of said first signal.

10. The system of claim 8 with said bypass means having a second condition in which said one condition is selected regardless of the occurrence or non-occurrence of said first signal and having a third condition in which said other condition is selected regardless of the occurrence or non-occurrence of said first signal.

11. The system of claim 8 with said bypass means including a spring member connected to said some of said filter members and preloaded to normally bias said some of said filter members to said opening position, and with said bypass means including actuating means connected said some of said filter members and controllable by energy from a source of electrical power for moving said some of said filter members to said closing position over the bias of said spring member.

12. The system of claim 11 with the air breathing apparatus being an engine for an aircraft and with said filter elements defining a louvered construction with said some of said filter elements being secured for pivotal movement to said closing and opening positions.

13. The system of claim 12 including indicating means for providing one indication to the operator when said some of said filter elements are in said closing position and another indication to the operator when said some of said filter elements are in an opening position.

14. The system of claim 1 with said sensing means comprising a control switch having closed and opened positions and with said bypass means comprising electrical circuit means for controlling the actuation of said bypass means, said electrical circuit means including a solenoid having a solenoid coil, a relay having a relay coil, said relay having an electrical contact assembly normally in one contact condition, said electrical circuit means further including first circuit means connecting said control switch to said relay coil for energizing said relay coil for moving said contact assembly from said one contact condition to another contact condition, and second circuit means for energizing said solenoid coil through said contact assembly in said one contact condition and for de-energizing said solenoid coil with said contact assembly in said other contact condition, and with said bypass means being actuable to said one condition with said solenoid de-energized and to said other condition with said solenoid energized.

15. The system of claim 14 with said electrical circuit means including a selector switch electrically connected with said first and second circuit means and having a plurality of selectable positions with a first selectable position permitting energization of said relay coil via said control switch and a second selectable position controlling the energization of said solenoid coil regardless of the position of said control switch.

16. The system of claim 14 with said circuit means including a selector switch electrically connected with said first and second circuit means and having a plurality of selectable positions with a first selectable position permitting energization of said relay coil via said control switch, a second selectable position for de-energizing said solenoid coil regardless of the position of said control switch and a third selectable position for energizing said solenoid coil regardless of the position of said control switch.

17. The system of claim 16 with said first circuit means including a hold path for holding said relay coil energized after said relay coil has been energized by said control switch.

18. The system of claim 16 with said circuit means further including a first electrically actuable alarm indicator for indicating the conditions of said control switch and third circuit means for energizing said first alarm indicator via said control switch regardless of the position of said selector switch.

19. The system of claim 16 with at least some of said filter elements being movable and with said bypass means being connected to said some of said filter elements for moving said some of said filter elements to a position closing said inlet in said other condition and to a position opening said inlet in said one condition.

20. The system of claim 19 with said circuit means further including a second electricaly actuable alarm indicator, an actuating switch adapted to be operated by said some of said filter members for indicating their condition, and fourth circuit means for energizing said second alarm indicator via said actuating switch regardless of the position of said selector switch.

21. The system of claim 20 with the air breathing apparatus being an engine for an aircraft and with said filter elements defining a louvered construction with said some of said filter elements being secured for pivotal movement to said closing and opening positions.

22. The system of claim 21 with said bypass means including a spring member connected to said some of said filter members and preloaded to normally bias said some of said filter members to said opening position and with said bypass means including actuating means actuable in response to energization of said solenoid for moving said some of said filter members to said closing position over the bias of said spring member.

23. The system of claim 22 in which said first and second alarm indicators are lights.

24. The system of claim 1 with said bypass means including a plurality of generally impervious panels being actuable for providing said bypass.

25. The system of claim 18 with said bypass means including a plurality of generally impervious panels being actuable for providing said bypass.

References Cited

UNITED STATES PATENTS

| | | | |
|---|---|---|---|
| 1,914,667 | 6/1933 | Kolla | 55—274 |
| 2,154,051 | 4/1939 | Martenis. | |
| 2,178,463 | 10/1939 | Bahnson | 55—290 X |
| 2,381,705 | 8/1945 | Vokes | 55—306 |
| 2,499,494 | 3/1950 | Greer | 210—130 X |
| 2,853,155 | 9/1958 | Peter | 55—352 |
| 2,927,659 | 3/1960 | Pabst et al. | 55—274 X |
| 2,949,976 | 8/1960 | Tuthill | 55—274 |
| 3,016,109 | 1/1962 | Howard | 55—312 X |
| 3,186,549 | 6/1965 | Botstiber | 210—130 X |

FOREIGN PATENTS

| | | |
|---|---|---|
| 411,214 | 3/1925 | Germany. |
| 433,056 | 8/1926 | Germany. |

HARRY B. THORNTON, *Primary Examiner.*

B. NOZICK, *Assistant Examiner.*